United States Patent
McDonald et al.

(10) Patent No.: US 10,298,406 B1
(45) Date of Patent: May 21, 2019

(54) SECURITY INTEGRATED CIRCUIT

(71) Applicant: Silego Technology, Inc., Santa Clara, CA (US)

(72) Inventors: John Othniel McDonald, Mountain House, CA (US); Nathan Willis John, Morgan Hill, CA (US); David Kun-Teh Chow, San Jose, CA (US)

(73) Assignee: Silego Technology, Inc., Santa Clara, CA (US)

( * ) Notice: Subject to any disclaimer, the term of this patent is extended or adjusted under 35 U.S.C. 154(b) by 217 days.

(21) Appl. No.: 15/169,206

(22) Filed: May 31, 2016

Related U.S. Application Data (60) Provisional application No. 62/168,495, filed on May 29, 2015, provisional application No. 62/183,623, filed on Jun. 23, 2015.

(51) Int. Cl.
*H04L 9/32* (2006.01)

(52) U.S. Cl.
CPC .......... *H04L 9/3271* (2013.01); *H04L 9/3226* (2013.01)

(58) Field of Classification Search
CPC ............. H04L 63/3226; H04L 63/3271; H04L 63/3231; H04L 63/3066; H04L 63/08; H04L 63/0428; H04L 2209/88
USPC ......................................................... 713/168
See application file for complete search history.

(56) References Cited

U.S. PATENT DOCUMENTS

| | | | | |
|---|---|---|---|---|
| 8,694,778 B2* | 4/2014 | Teuwen | ................ | H04L 9/3278 713/168 |
| 9,154,480 B1* | 10/2015 | Juels | ....................... | H04L 63/08 |
| 2009/0106042 A1* | 4/2009 | Maytal | ................ | G06Q 30/018 705/317 |
| 2009/0292918 A1* | 11/2009 | Mori | ...................... | G06F 21/31 713/168 |
| 2011/0277030 A1* | 11/2011 | Gillespie | ................ | G06F 21/34 726/17 |
| 2012/0213361 A1* | 8/2012 | Lim | ..................... | H04L 9/3066 380/44 |
| 2014/0310774 A1* | 10/2014 | Etchegoyen | ........ | H04L 63/0876 726/3 |
| 2015/0207627 A1* | 7/2015 | Yamamoto | ................ | H04L 9/32 713/168 |
| 2015/0318998 A1* | 11/2015 | Erlikhman | ................ | H04L 9/32 713/171 |

* cited by examiner

*Primary Examiner* — Samson B Lemma
(74) *Attorney, Agent, or Firm* — Van Pelt, Yi & James LLP (57) ABSTRACT

A security integrated circuit is disclosed. In some embodiments, the security integrated circuit comprises metal configured memory that stores a first portion of each of a plurality of keys, programmable memory that stores a second portion of each of the plurality of keys, and an interface for connecting to an external authentication system. The metal configured memory and programmable memory store a prescribed finite number of host keys and matching device keys. In response to a received host key from the external authentication system, a matching device key is provided by the security integrated circuit.

20 Claims, 10 Drawing Sheets

SECURITY INTEGRATED CIRCUIT

CROSS REFERENCE TO OTHER APPLICATIONS

This application claims priority to U.S. Provisional Patent Application No. 62/168,495 entitled SECURITY INTEGRATED CIRCUIT filed May 29, 2015 which is incorporated herein by reference for all purposes and to U.S. Provisional Patent Application No. 62/183,623 entitled LOW COST, TWO PHASE AUTHENTICATION DEVICE AND METHOD filed Jun. 23, 2015 which is incorporated herein by reference for all purposes.

BACKGROUND OF THE INVENTION

Existing security architectures typically comprise complex circuitry having a large footprint and substantial cost. Such security solutions are prohibitive for many consumer products for which security may be desirable. Thus, improved security architectures are needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied in a non-transitory computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Various techniques for authenticating items such as consumer products are disclosed. Despite being relatively simple and having low implementation costs, the disclosed techniques offer very effective security and high reliability. For the aforementioned qualities, embodiments of the disclosed authentication system are especially attractive to manufacturers who wish to protect their products against counterfeits. The disclosed techniques may be employed to not only identify counterfeit versions of items or products in the market but also to inflict comprehensive financial damage on fraudulent supply chains and counterfeiters. The disclosed authentication techniques may generally be employed with respect to any applicable contexts but practically may be most suitable for items for which economical and small form factor security solutions are desirable, such as high end consumer products like electronic devices, wine bottles, shoes, watches, and other branded items that have a high likelihood of being counterfeited.

Figure 1A:
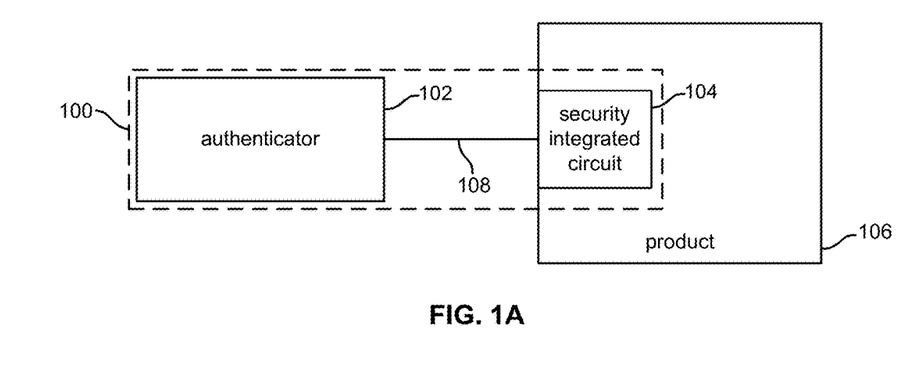
FIG. 1A is a high level block diagram illustrating an embodiment of components comprising a security system.

FIG. 1A is a high level block diagram illustrating an embodiment of components comprising a security system. As depicted, security system 100 comprises an external authentication system or authenticator 102 and a security integrated circuit 104 that is included or embedded in a product 106, for example, by the manufacturer of the product during manufacturing. Authenticator 102 and security integrated circuit 104 are connected by connection 108. Authentication is facilitated by security system 100 via a challenge and response protocol. Specifically, authenticator 102 determines the authenticity of product 106 by determining whether a valid response is returned by security integrated circuit 104 to a challenge from authenticator 102. As used herein, the challenge comprises a prescribed host key, and a response comprises a matching device key. Thus, a product is determined to be authentic if a matching device key is returned by security integrated circuit 104 in response to a prescribed host key from authenticator 102 and is determined to be counterfeit otherwise.

Security integrated circuit 104 includes a prescribed finite number of matching host and device key pairs. In some embodiments, the host and device keys of a matching pair each comprise a random or pseudo-random number or code. In some such cases, no mathematical and/or logical relationships exist between the host and device keys of a matching pair, i.e., the host and device keys of a pair are completely random relative to one another. That is, a device key is not derived or computed by performing various mathematical and/or logical operations on its corresponding host key. Thus, security integrated circuit 104 need not include complex processing circuitry to compute a device key from a host key. Rather, security integrated circuit 104 is loaded with predetermined matching host and device key pairs and, therefore, performs a simple lookup and/or read operation when challenged with a host key. Specifically, security integrated circuit 104 responds with a matching device key when queried or challenged with a prescribed host key. In various embodiments, the host and device keys may comprise any numbers of bits, with more bits providing increased code complexity and security.

In some embodiments, a portion of each host/device key is configured in metal, and a portion of each host/device key is programmed into NVM (non-volatile memory). Since only a portion of each key is configured in metal, the semiconductor fabrication facility at which security integrated circuit 104 is fabricated does not have complete knowledge of the full key. Likewise, since only a portion of each key is programmed in NVM, a programming house at which security integrated circuit 104 is programmed does not have complete knowledge of the full key. Thus, separation of each key into metal and NVM memory components assists in preventing leaks of complete keys to counterfeiters. As one design example, fifty percent of each key is metal configured and fifty percent of each key is NVM configured. With this scheme, for instance, for a host/device key comprising a total of 128 bits, 64 bits are metal configured and 64 bits are NVM configured. In some embodiments, the same metal portions of keys but different NVM portions of keys may be used for different products of the same manufacturer so that a common metal mask may be employed for multiple products to save expense. In some embodiments, security integrated circuit 104 furthermore includes an NVM programmable device address or identifier comprising a prescribed number of bits (e.g., 64 bits). This device identifier may be employed to identify a particular product or a particular product type, for example, in which security integrated circuit 104 is included or embedded.

Figure 1B:
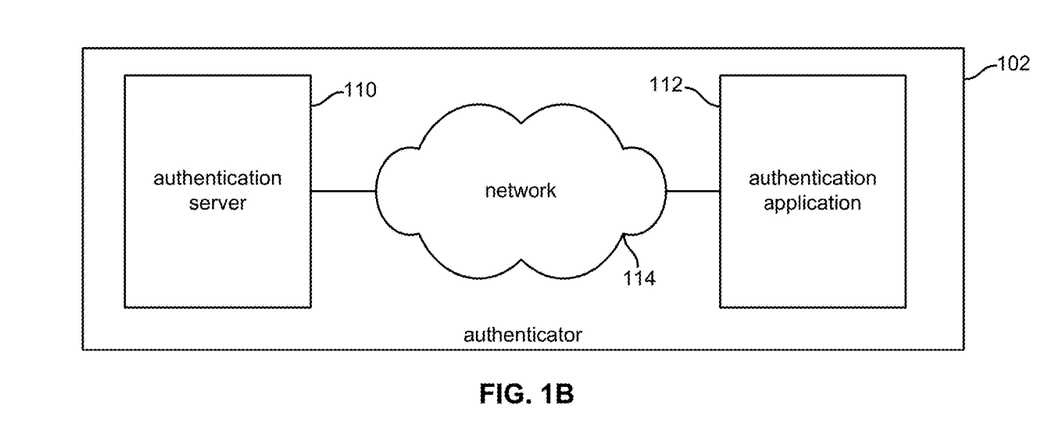
FIG. 1B is a high level block diagram illustrating an embodiment of an authentication system.

Authenticator 102 facilitates the authentication of product 106 by providing a challenge (i.e., host key) to security integrated circuit 104 of product 106 and validating a received response (i.e., device key) to the challenge. In FIG. 1A, authenticator 102 comprises a single block. In such cases, for example, authenticator 102 may comprise an internet connected device that communicates over a network with a manufacturer of product 106 to obtain and/or validate keys. Alternatively, authenticator 102 may comprises a plurality of possibly networked components. FIG. 1B is a high level block diagram illustrating an embodiment of authenticator 102. In the example of FIG. 1B, authenticator 102 comprises authentication server 110 and authentication application 112. Authentication server 110 comprises a component of authenticator 102 associated with a manufacturer of product 106, and authentication application 112 comprises a component of authenticator 102 associated with a seller of product 106. Authentication server 110 hosts an authentication website and/or application for products of a manufacturer. A seller subscribes to the authentication service by installing and executing authentication application 112 on a seller-side device. In various embodiments, the seller device that interfaces with security integrated circuit 104, e.g., on which authentication application 112 is installed, may comprise a smartphone, tablet, personal digital assistant, laptop, computer, or other dedicated device or processor. The manufacturer-side and seller-side components of authenticator 102 communicate via a network 114 such as the internet or a cellular network. Network communications may be encrypted for security.

In some embodiments, authenticator 102 initially stores an original (first) matching host and device key pair and does not store other host and device key pairs. During the time that the original pair is valid, a product is deemed to be authentic or counterfeit depending upon whether an authenticity check with respect to the original pair passes, i.e., whether a security integrated circuit of the product responds with the original device key to a challenge comprising the original host key. After a prescribed period of time or on demand from the manufacturer, a second host and device key pair is released by the manufacturer and provided to authenticator 102. The second pair becomes the currently valid pair. That is, authenticity is checked against at least the second pair and, in some cases, both the original pair and the second pair. If an authenticity check with respect to the second pair does not pass, a product is deemed to be counterfeit, i.e., even if an authenticity check with respect to the original pair passes. After a prescribed period of time or on demand from the manufacturer, a third host and device key pair is released by the manufacturer and provided to authenticator 102. The third pair becomes the currently valid pair. That is, authenticity is checked against at least the third pair and, in some cases, also against the original pair and/or the second pair. In some embodiments, the second pair is deleted at authenticator 102 upon receipt of the third pair. If an authenticity check with respect to the third pair does not pass, a product is deemed to be counterfeit, i.e., even if an authenticity check with respect to the original pair and/or the second pair passes. This process continues over time for up to any prescribed number N of host and device key pairs available for a product or product type, all N of which are stored on a security integrated circuit included or embedded in a product or instances of a product type. In some embodiments, authenticator 102 only stores the original pair and/or the currently valid pair, i.e., intermediary pairs are purged when a new currently valid pair is released. In some embodiments, the original pair is retained and never purged. As described, security for a product or product type in the market is provided by the limited release and validity of host/device key pairs over time. The release times of pairs are in accordance with a security policy specified by the manufacturer and may be based on various factors including the turnaround time for counterfeiters to release counterfeit versions into the market. The release of new pairs may be spread over the expected market life of a product or product type. Since the currently valid pair keeps changing over time and is not known prior to release, counterfeits in the market that are manufactured with an older pair can be easily identified. Only authentic products are able to respond correctly as the currently valid pair keeps changing over time.

Figure 2:
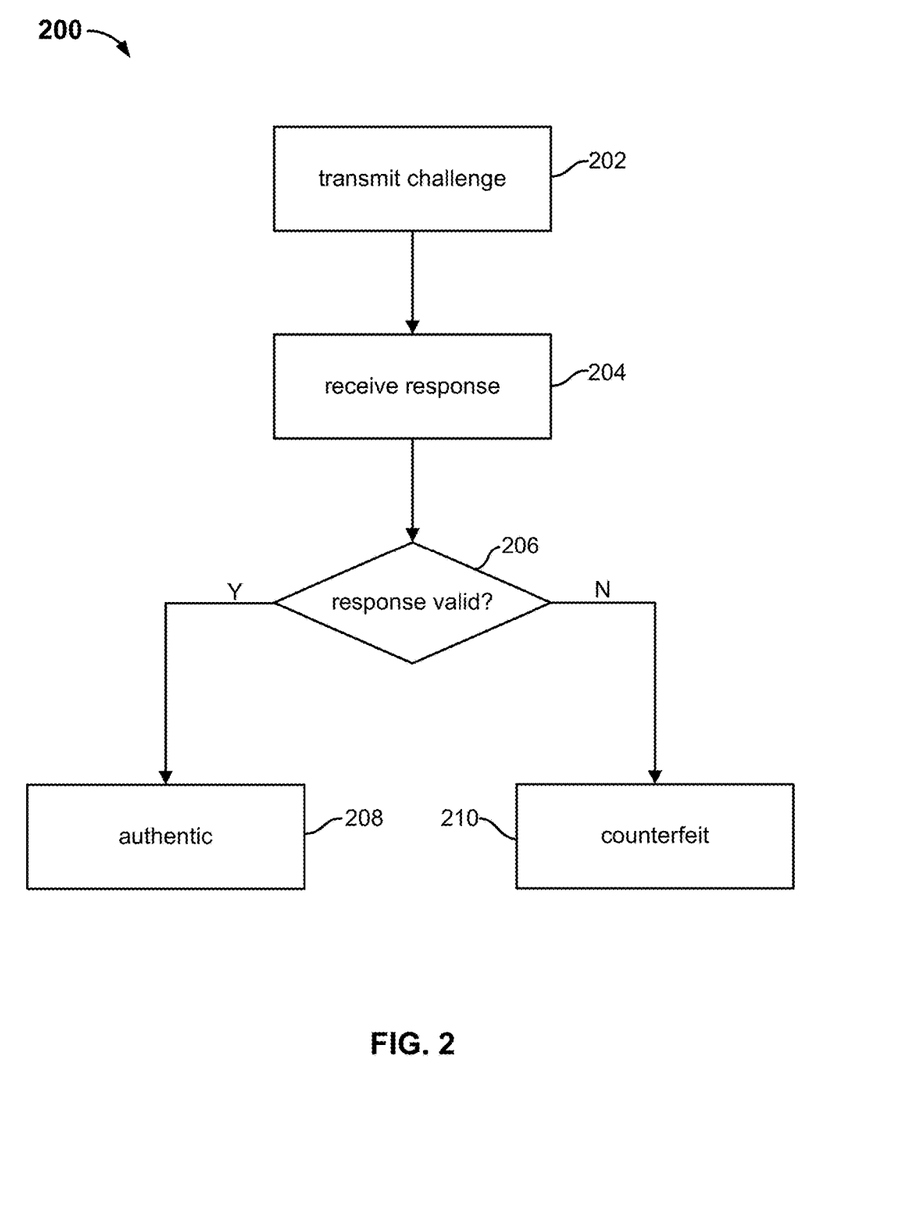
FIG. 2 is a flow chart illustrating an embodiment of a challenge and response authentication process.

FIG. 2 is a flow chart illustrating an embodiment of a challenge and response authentication process. In some embodiments, process 200 is employed by authenticator 102 or one or more parts thereof, such as authentication server 110 and/or authentication application 112. At step 202, a challenge is transmitted, for example, from authenticator 102 to security integrated circuit 104. For instance, authentication application 112 may request and receive a currently valid challenge (i.e., host key) from authentication server 110 and send the challenge to security integrated circuit 104 via connection 108. Alternatively, authentication application 112 may have the latest currently valid challenge. In some cases, new keys are pushed from authentication server 110 to authentication application 112 as and when they are released. At step 204, a response to the transmitted challenge is received, for example, by authenticator 102 from security integrated circuit 104 via connection 108. At step 206, it is determined whether the response is valid. In the event that it is determined at step 206 that the response is valid, an associated product in which the security integrated circuit to which the challenge was sent is embedded is determined to be authentic at step 208. In the event that it is determined at step 206 that the response is not valid, an associated product in which the security integrated circuit to which the challenge was sent is embedded is determined to be counterfeit at step 210. In some embodiments, authentication application 112 validates the response at step 206, e.g., if both host and matching device keys are provided to authentication application 112 by authentication server 110. Alternatively, authentication application 112 may transmit the response to authentication server 110 for validation at step 206. In the event that validation step 206 is executed by authentication server 110, validation result 208 or 210 is transmitted to authentication application 112. In various embodiments, authentication of a product may comprise repeating process 200 for a plurality of different matching host and device key pairs, such as a currently valid pair, an original pair, and/or previously released pairs, as specified by a security policy of a manufacturer of the product. Although not shown in FIG. 2, in some embodiments, process 200 further includes an initial step of reading a device identifier from security integrated circuit 104 to determine the product or product type for which authentication is to be performed so that a corresponding valid key pair may be selected for the authentication process.

Authenticator 102 and security integrated circuit 104 are connected by connection 108. For example, a seller device on which authentication application 112 is installed is connected to security integrated circuit 104 via connection 108. In various embodiments, connection 108 may comprise any wired and/or wireless connection and communication technique. In some embodiments, connection 108 comprises a one wire communication scheme. Such a one wire communication scheme may comprise two physical connections to security integrated circuit 104, i.e., one for a data signal and the other for ground. For example, connection 108 may comprise a single cable with a USB connector at one end that connects to the seller device and one or more probes at the other end that interface with security integrated circuit 104. In some embodiments, in addition to comprising a data line, connection 108 comprises a power line. That is, power to security integrated circuit 104 is provided over connection 108 along with data. In some such cases, the ground connection is biased to a prescribed bias voltage. For example, a "1" may be represented by 5V and a "0" by 1.8V, 2.5V, 3.3V, or some other voltage value lower than the voltage representing a "1". In other embodiments, power to security integrated circuit 104 may be supplied over a separate connection.

In various embodiments, any desired communication or signaling scheme may be employed between authenticator 102 and security integrated circuit 104 over connection 108. In some embodiments, the signal comprises a serial data stream that is, for example, framed by start and stop sequences. In some embodiments, the signal comprises a BMC (biphase mark coding) communication. In various embodiments, the signal may comprise a digital signal or a mixed signal. A mixed signal (e.g., a four level analog signal) may be desirable for instances requiring higher security since a mixed signal is more immune to cracking or hacking than a purely digital signal. In some embodiments, timeout, reset, and/or error-detecting features are supported for interrupted data streams. For example, when a data stream from authenticator 102 is interrupted, a timeout of a prescribed amount of time may be initiated and followed by a reset, which restarts communication with a new start sequence. A data stream from security integrated circuit 104 may include an error-detecting code such as a cyclic redundancy check (CRC) that may be employed by authenticator 102 to detect errors. When an error is detected, for example, a timeout of a prescribed amount of time may be initiated to ensure transmission has stopped before restarting communication.

Figure 3A:
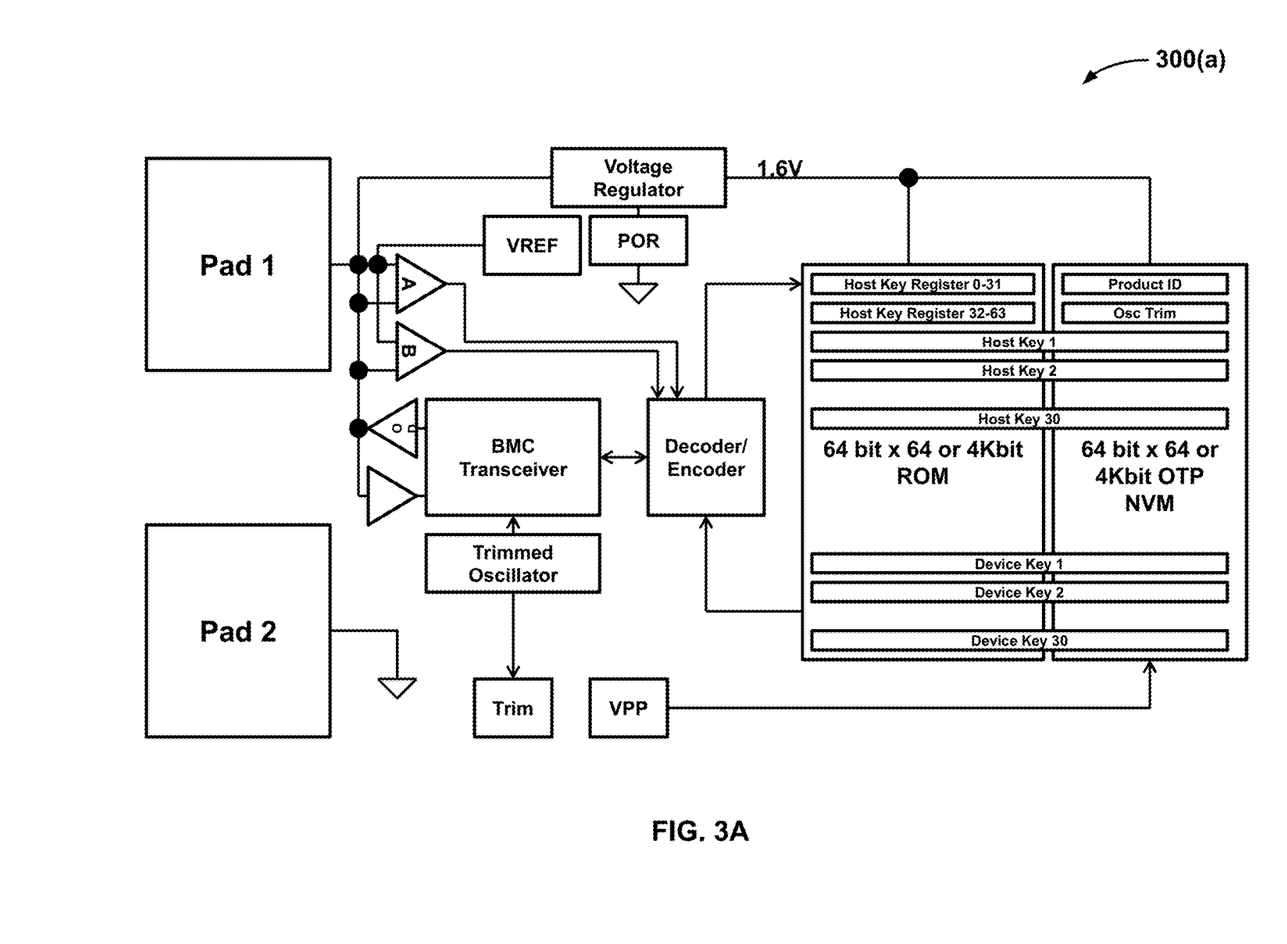
FIGS. 3A-3C are high level circuit diagrams of example embodiments of a security integrated circuit.
Figure 3B:
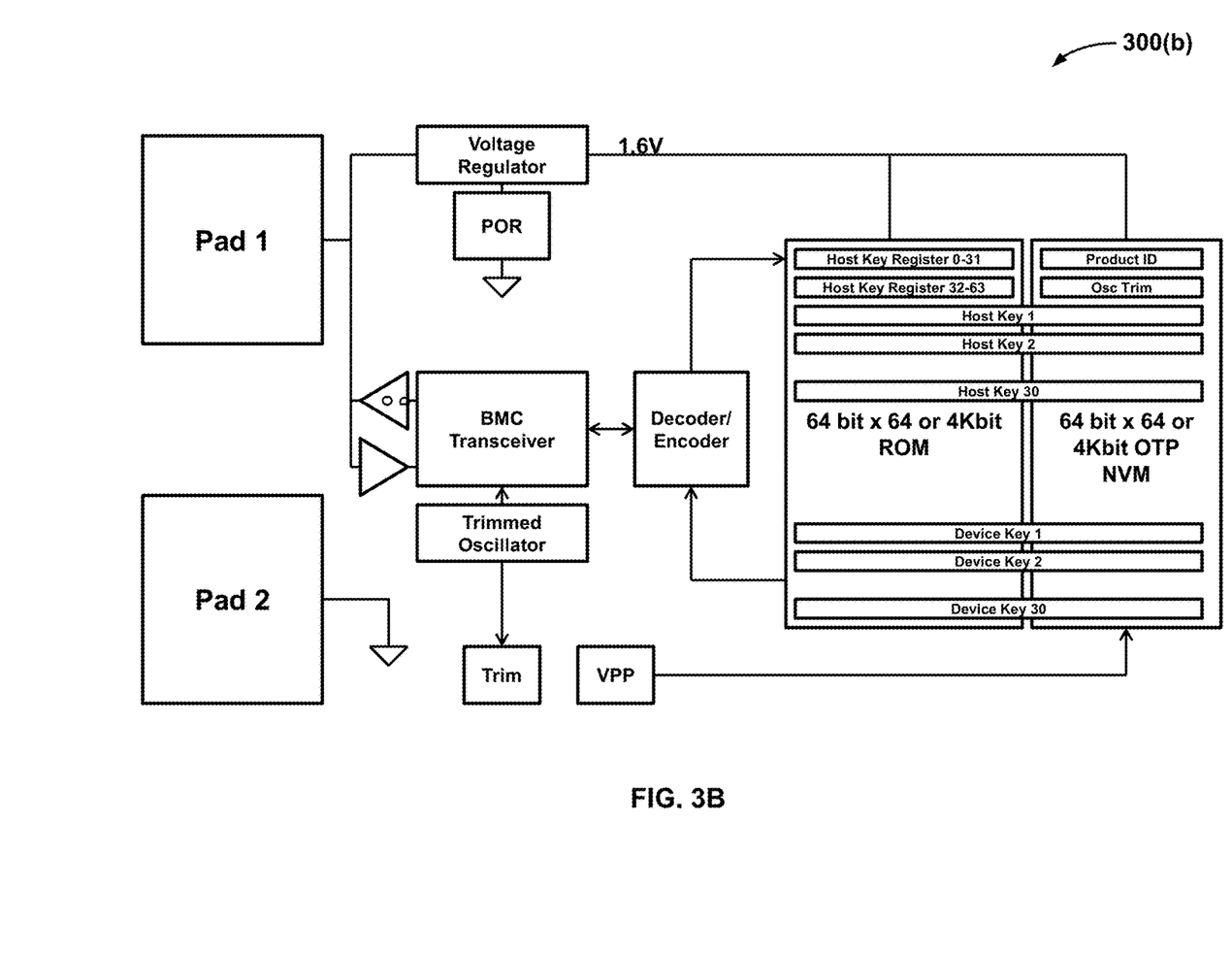
Figure 3C:
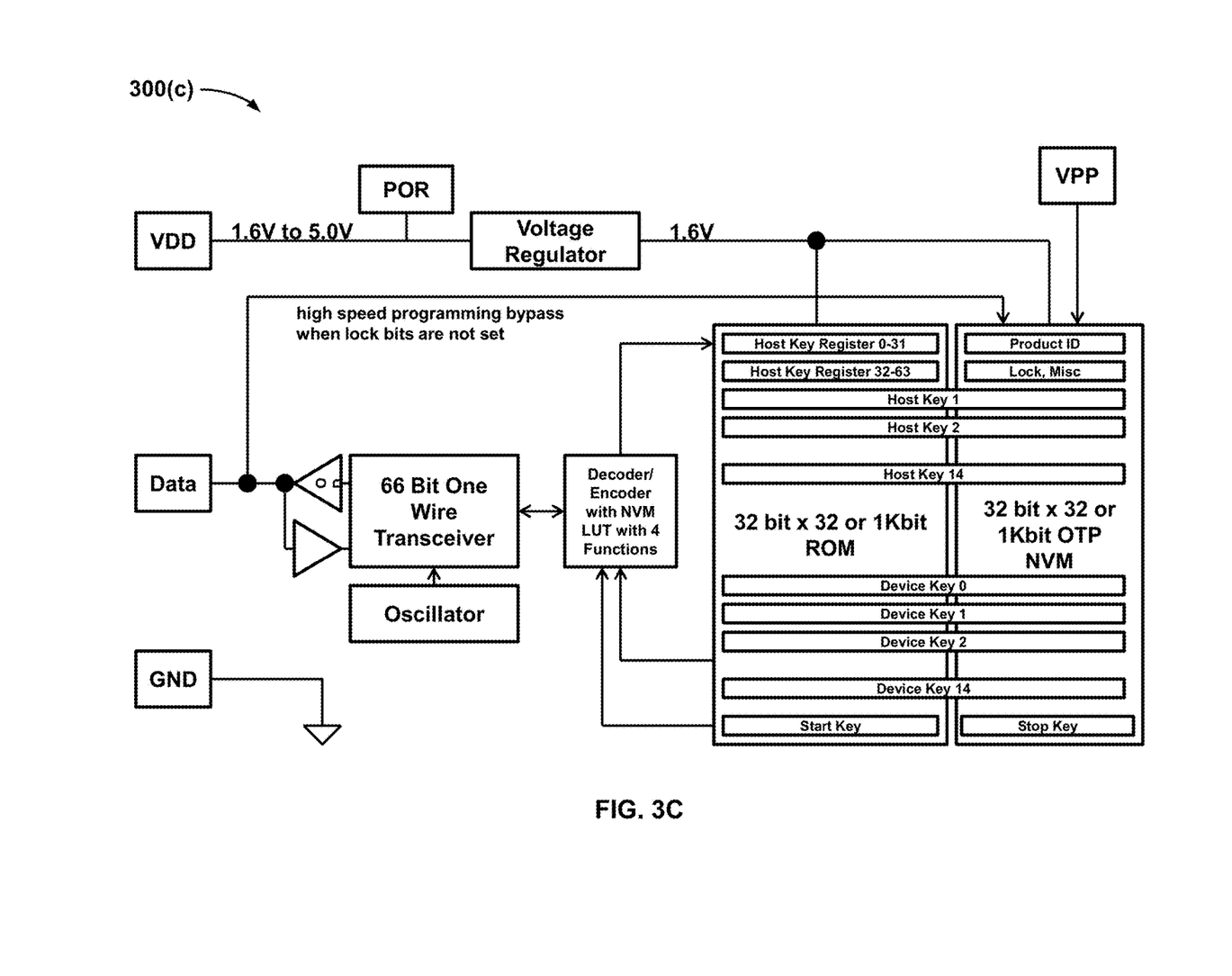

FIGS. 3A-3C are high level circuit diagrams of example embodiments of a security integrated circuit, such as security integrated circuit 104 of FIG. 1A. As depicted, in all of the security integrated circuit configurations of FIGS. 3A-3C, portions of each key are stored on both metal configured memory and programmable memory, i.e., ROM (read-only memory) and OTP NVM (one-time programmable non-volatile memory). Security integrated circuit embodiments 300(*a*) and 300(*b*) of FIGS. 3A-3B support communication with an external authentication system via a single wire or cable over which power is also transmitted in addition to data. Moreover, these security integrated circuit embodiments comprise pads via which the circuits may be interfaced using a pair of electrical probes. Security integrated circuit 300(*c*) of FIG. 3C supports data communication over a single wire or cable, but power is supplied via a separate line or connection. Thus, this embodiment comprises a three connection interface to which an external authentication system may connect, for example, via a three pin connector or using three electrical probes on three pads comprising the interface. The security integrated circuit configurations of FIGS. 3A-3C comprise example implementations. In other embodiments, a security integrated circuit may be designed using a combination of any one or more appropriate components to provide the described functionalities.

Figure 4:
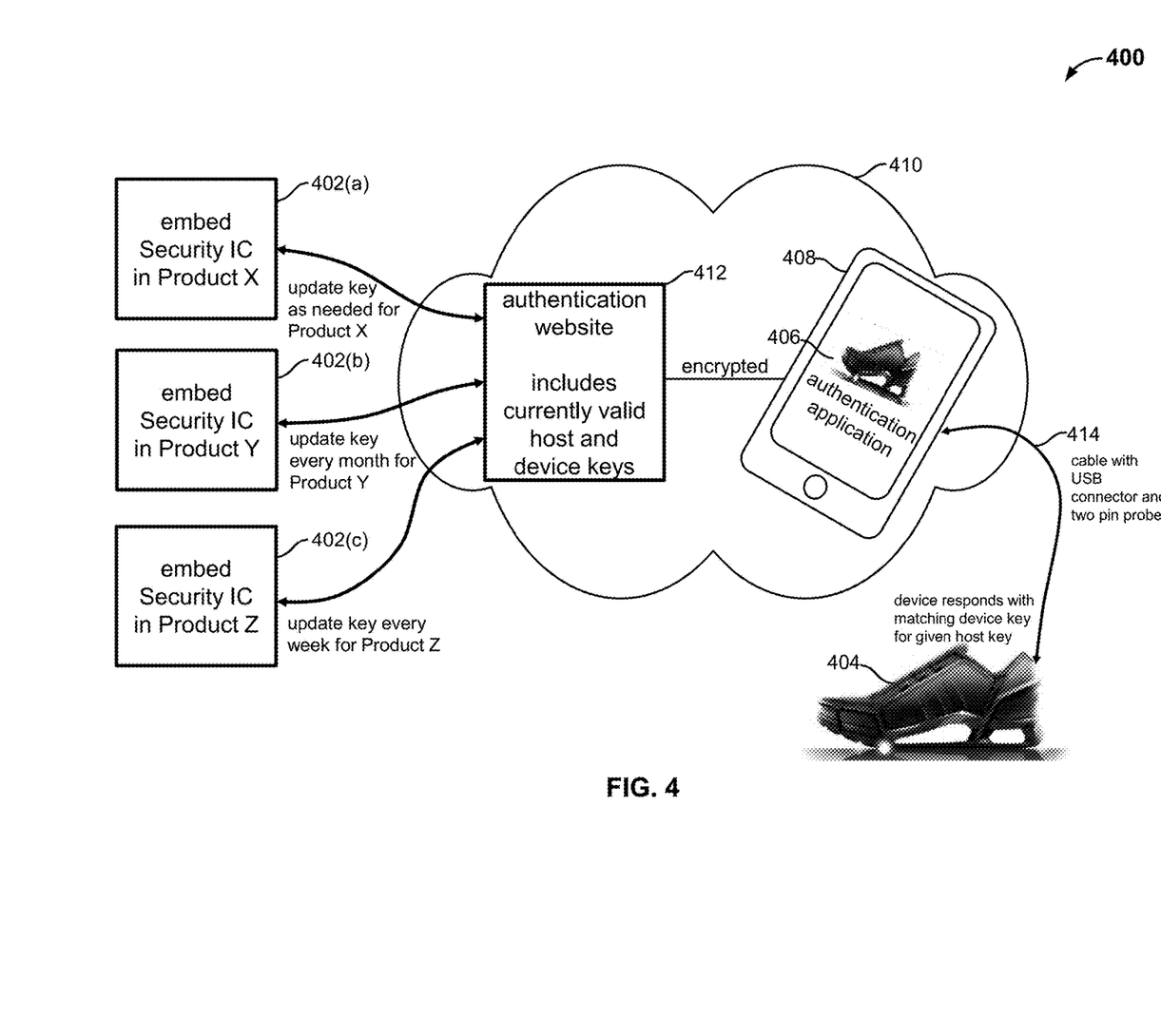
FIG. 4 illustrates an embodiment of an example use case of the disclosed security system.

FIG. 4 illustrates an embodiment of an example use case of the disclosed security system. In authentication environment 400, blocks 402(*a*)-(*c*) represent embedding security integrated circuits into different products of a manufacturer, i.e., shoes produced by a shoe manufacturer. Shoe 404 represents an example product whose authenticity is tested by a seller in authentication environment 400. The seller employs a verified authentication application 406 installed on smartphone 408 which communicates in a secure manner over network 410 with an authentication website 412 that includes all currently valid host and device key pairs. The host and device key pairs for various products are updated at authentication website 412 at prescribed time intervals or as desired by the manufacturer. Smartphone 408 connects to the security integrated circuit embedded in the heel of shoe 404 via a cable 414 comprising a USB connector at one end and a two pin probe at the other end. Authentication application 406 initially reads the device identifier of the security integrated circuit embedded in product 404 and then requests valid keys for that device identifier from authentication website 412. Original and/or latest keys are provided from authentication website 412 to authentication application 406 using a secure, encrypted communication protocol over network 410. In the given example, a picture of the product associated with the device identifier is also provided from authentication website 412 to authentication application 406 for display at smartphone 408. Received host keys are sent to the security integrated circuit embedded in product 404. In response, the security integrated circuit embedded in product 404 sends device keys to authentication application 406, which forwards the device keys to authentication website 412 for verification. Authentication website 412 either confirms a match (authentic) or identifies a no-match (counterfeit).

Figure 5:
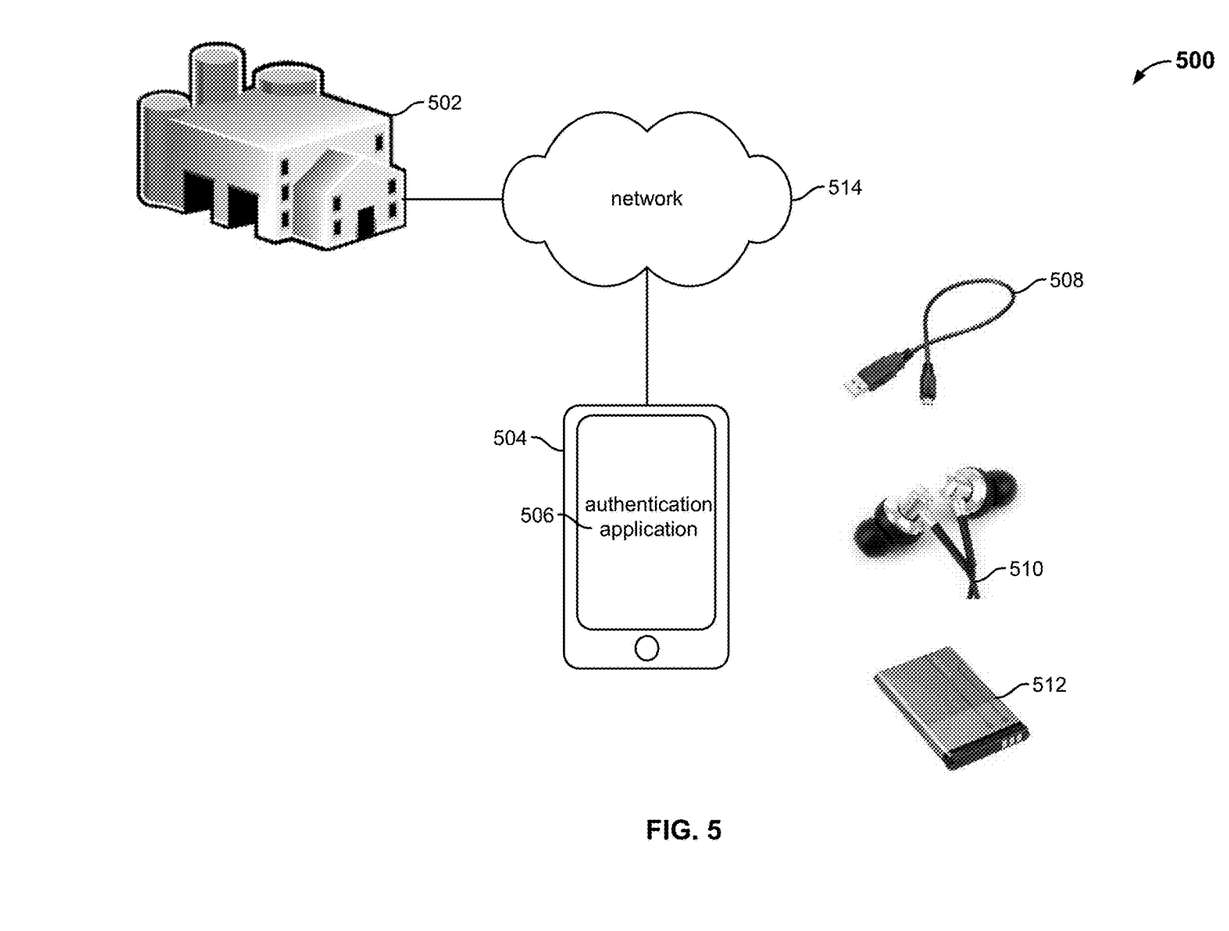
FIG. 5 illustrates an embodiment of an example use case of the disclosed security system.

FIG. 5 illustrates an embodiment of an example use case of the disclosed security system. In authentication environment 500, a manufacturer 502 of smartphone 504 installs authentication application 506 on smartphone 504 that includes the device identifiers and original host and devices key pairs for products associated with smartphone 504. In the given example, the products to authenticate comprise standard smartphone accessories and peripherals including a USB to mini USB adapter 508, earbuds 510, and battery 512, each of which is embedded with a security integrated circuit. Smartphone 504 runs authentication application 506 whenever a new connection with a device, such as any of devices 508-512, is detected and reads the device identifier of the security integrated circuit embedded in the detected device. Authentication application 506 may decide whether to authenticate the detected device according to a security policy, for example, as specified by manufacturer 502. For instance, authentication application 506 may authenticate the detected device if the corresponding device identifier has never been authenticated or if it has not been authenticated in a prescribed amount or period of time. In order to authenticate the detected device, authentication application 506 sends a currently valid host key to the security integrated circuit embedded in the detected device and in response receives a device key from the security integrated circuit. If the returned device key matches the given host key, the detected device is deemed to be authentic and otherwise counterfeit. New host and device key releases are provided to authentication application 506 from manufacturer 502 via network 514, which may, for example, comprise the internet or a mobile network. In various embodiments, new keys may be released at first activation of smartphone 504, at the time of an operating system upgrade of smartphone 504, at scheduled intervals, according to a security police specified by manufacturer 502, according to the expected development schedule of counterfeiters, etc. Authentication of a prescribed product or product type may be performed over the lifetime of the product with up to a prescribed finite number of new keys, wherein the prescribed finite number of new keys corresponds to the total number of key pairs stored in a corresponding security integrated circuit embedded in the product or product type.

A notable objective of the disclosed security system is to inflict maximum financial damage on fraudulent supply chains and counterfeiters. For example, consider the launch of a new product in the market that includes an embedded security integrated circuit. At launch, the original (first) host and device keys pair is the currently valid pair for the product and is released to an authentication system, such as authentication server 110 and/or authentication application 112, so that products in the market can be tested for authenticity. Counterfeiters may easily crack the released original keys, for example, by analyzing data traffic associated with authentication server 110 or by directly cracking into the embedded firmware code of authentication server 110. In some embodiments, the host and device keys may intentionally be given a mathematical and/or logical relationship instead of being completely random relative to one another in order to deceive counterfeiters into believing that they have successfully cracked the code and found the relationship between host and device keys and give them a false sense of confidence in proceeding with their counterfeiting efforts. Thereafter, counterfeiters manufacture counterfeit versions of the product with embedded security chips having the original keys and introduce the counterfeit versions into the market. At this time, the real manufacturer of the product releases a new pair of keys as the currently valid pair. Only authentic products pass authentication with respect to the new keys. That is, counterfeit products manufactured with the original keys fail authentication with respect to the newly released keys and are quickly identified and removed from the market. Counterfeiting efforts during other stages of the market lifetime of the product face similar setbacks as new keys are released by the real manufacturer. Keys are unknown prior to release and can only be cracked once they are released. Thus, the disclosed security system assists manufacturers in persistently spoiling ongoing counterfeiting efforts and discouraging future efforts.

Additional immunity to counterfeiting may be achieved by selecting various design parameters for security integrated circuit 104 that make replication by counterfeiters difficult. For example, the size, speed, function, and power consumption of security integrated circuit 104 may require custom silicon, i.e., a custom ASIC (application-specific integrated circuit), which introduces delay in producing counterfeits. Moreover, multiple variants of security integrated circuit 104 may be introduced to increase the cost of counterfeiting by requiring multiple ASICs. Furthermore, security integrated circuit 104 may be designed with enough complexity so that quick and easy replication using discrete logic is not possible. In some embodiments, messaging associated with security integrated circuit 104 may require at least a prescribed amount of time, i.e., may be sufficiently slow so that brute force cracking of the codes from the circuit itself would take a significant amount of time.

Figure 6:
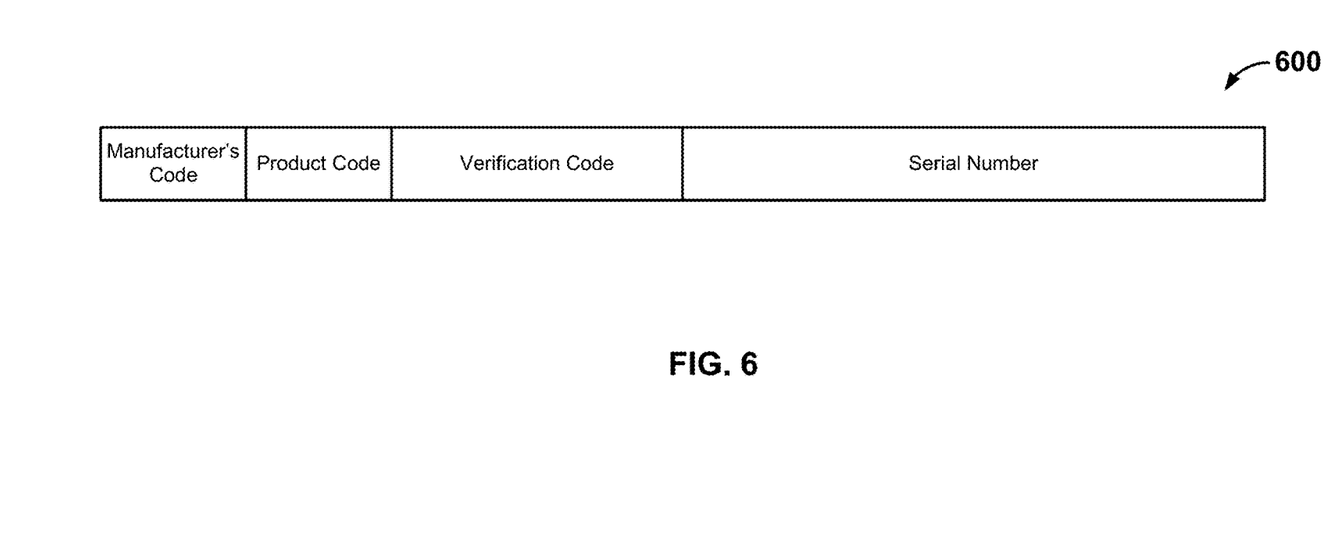
FIG. 6 illustrates an embodiment of a device header data structure.

In some embodiments, a two-phase authentication scheme is employed wherein the above described host/device key authentication comprises the second phase. In such embodiments, the first phase comprises an authenticity check with respect to an encrypted device header stored in a security integrated circuit. In various embodiments, the device header may include device specific, manufacturer specific, and/or manufacturing process specific information. FIG. 6 illustrates an embodiment of a device header data structure. In the example of FIG. 6, device header 600 includes a manufacturer's code field, a product code field, a verification code field, and a serial number field. As a specific example, a 128 bit (16 bytes) device header may comprise a manufacturer's code field with a field length of two bytes, a product code field with a field length of two bytes, a verification code field with a field length of four bytes, and a serial number field with a field length of eight bytes. The device header is stored in encrypted form. In some cases, the device header is encrypted using an algorithm that satisfies AES (Advanced Encryption Standard) specifications. The encrypted device header is stored with no access restriction and may be directly read without requiring a key. The serial number comprising the device header is unique to each device and may be used to track counterfeits. The serial number is fully protected, i.e., has no external access. In some embodiments, device keys used in the second phase are encrypted using the serial number and stored in encrypted form.

Figure 7:
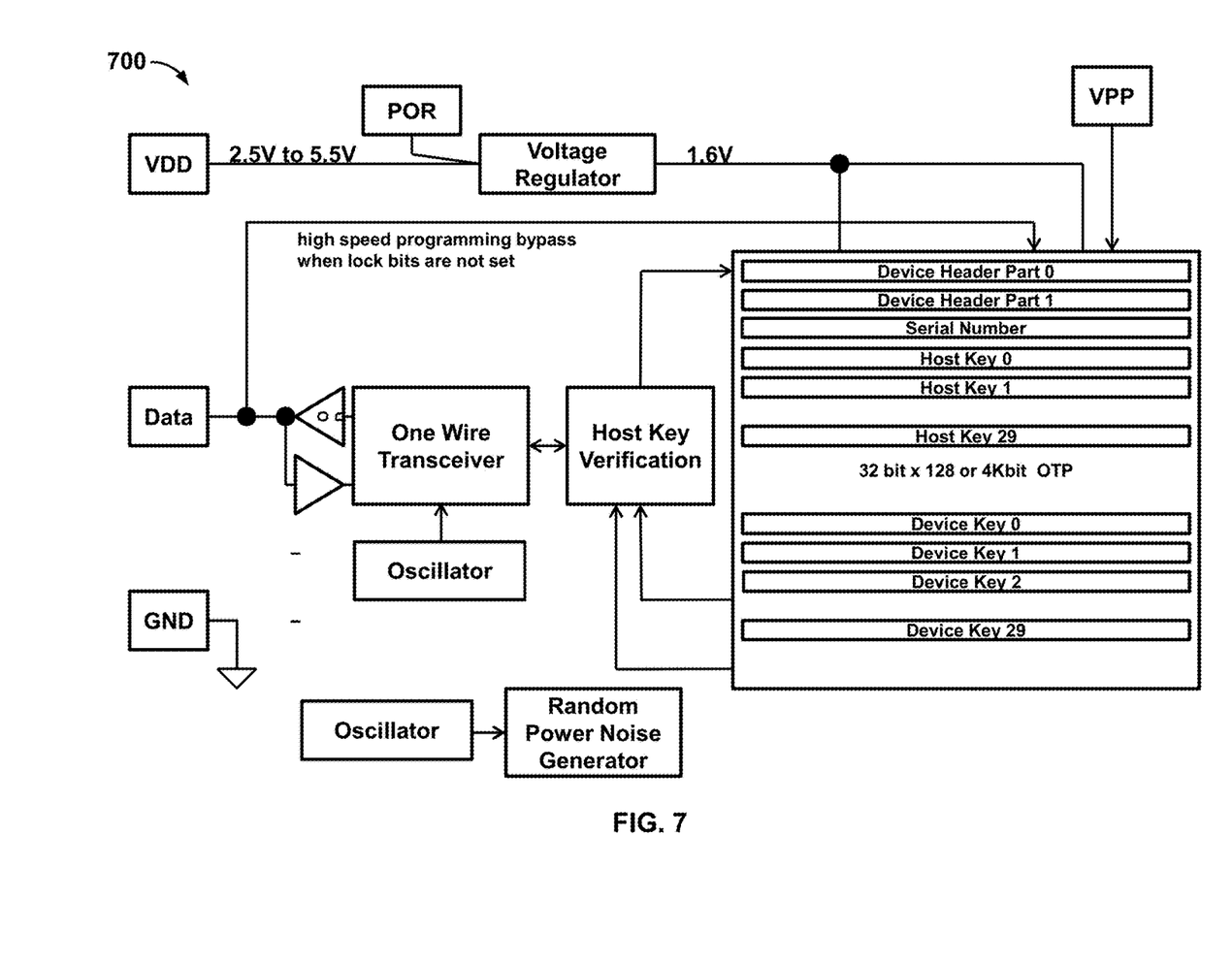
FIG. 7 is a high level circuit diagram of an example embodiment of a security integrated circuit that supports two-phase authentication.

FIG. 7 is a high level circuit diagram of an example embodiment of a security integrated circuit that supports two-phase authentication. Security integrated circuit 700 may comprise security integrated circuit 104 of FIG. 1A. In the given example, the device header, serial number, and complete keys are stored in programmable memory (OTP NVM). However, in other embodiments, portions of one or more keys may be stored in metal configured memory (e.g., ROM). Security integrated circuit 700 supports data communication over a single wire or cable, but power is supplied via a separate line or connection. Thus, this embodiment comprises a three connection interface to which an external authentication system may connect, for example, via a three pin connector or using three electrical probes on three pads comprising the interface. The security integrated circuit configuration of FIG. 7 comprises an example implementation. In other embodiments, a security integrated circuit may be designed using a combination of any one or more appropriate components to provide the described two-phase authentication functionalities.

Figure 8:
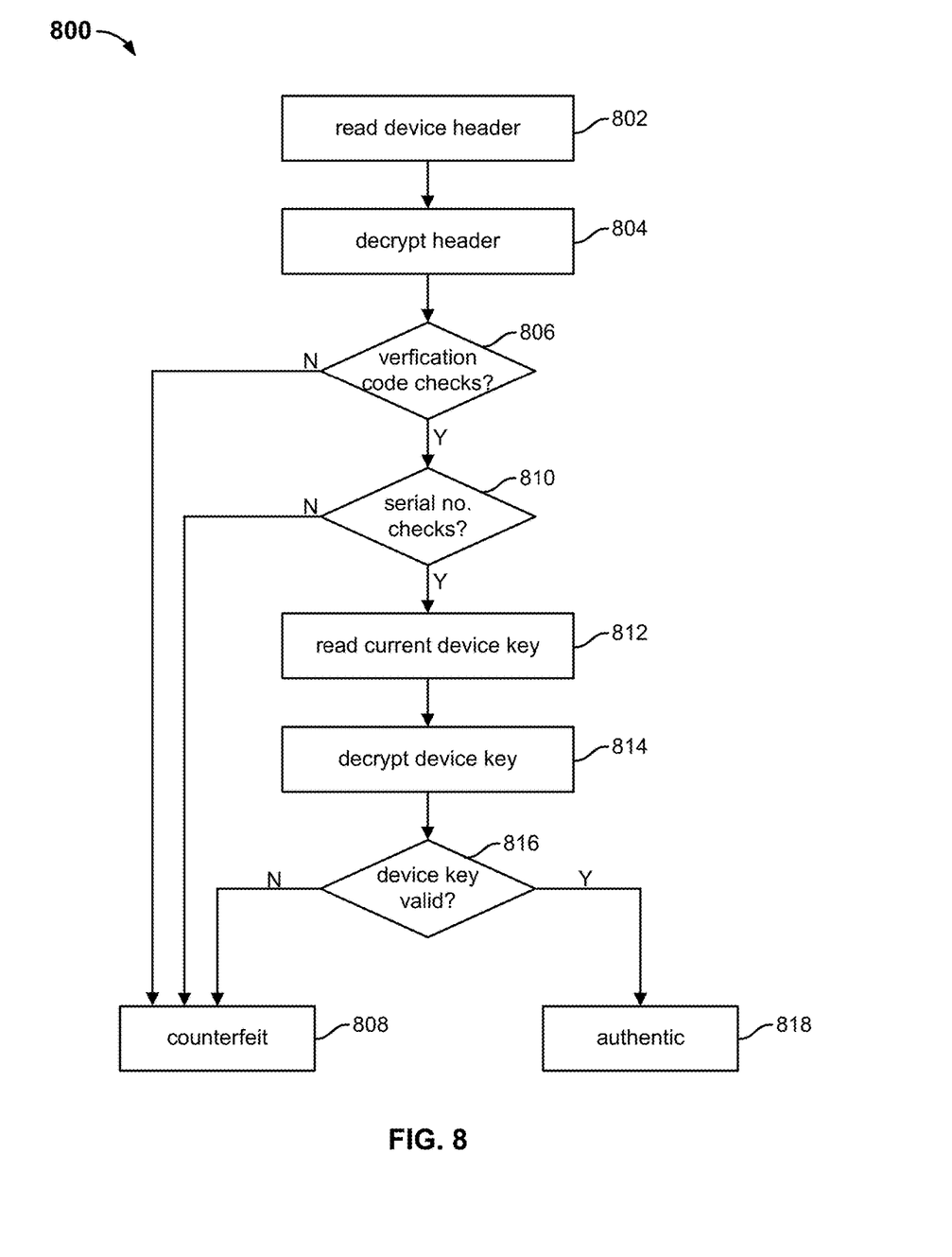
FIG. 8 is a flow chart illustrating an embodiment of a two-phase authentication process.

FIG. 8 is a flow chart illustrating an embodiment of a two-phase authentication process. In some embodiments, process 800 is employed by authenticator 102 or one or more parts thereof, such as authentication server 110 and/or authentication application 112, with respect to a security integrated circuit. Phase one of authentication process 800 starts at step 802 at which the device header is read. At step 804, the device header is decrypted. At step 806, a verification code extracted from the device header is checked. In the event that the verification code check fails at step 806, an associated product is determined to be counterfeit at step 808. In the event that the verification code check passes at step 806, a serial number extracted from the device header is verified at step 810. In the event that the serial number verification fails at step 810, an associated product is determined to be counterfeit at step 808. In the event that the serial number verification passes at step 810, phase two of authentication process 800 starts at step 812 at which an encrypted currently valid device key is read using the corresponding currently valid host key. At step 814, the device key is decrypted. At 816, it is determined whether the device key is valid. In the event that it is determined at step 816 that the device key is not valid, an associated product is determined to be counterfeit at step 808. In the event that it is determined at step 816 that the device key is valid, an associated product is determined to be authentic at step 818. In some embodiments, phase two of process 800 may be repeated for a plurality of different matching host and device key pairs, such as a currently valid pair, an original pair, and/or previously released pairs, as specified by a security policy of a manufacturer of the associated product.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A circuit, comprising:
   metal configured memory that stores a first portion of each of a plurality of keys and programmable memory that stores a second portion of each of the plurality of keys, wherein each complete key is separated into metal and programmable portions, the metal portion is fabricated during circuit fabrication, and the programmable portion is programmed in programmable memory of the fabricated circuit; and
   an interface to connect to an external authentication system;
   wherein the metal configured memory and programmable memory store a prescribed finite number of host keys and matching device keys; and
   wherein in response to a received host key from the external authentication system, a matching device key is provided by the circuit.

2. The circuit of claim 1, wherein the received host key from the external authentication system comprises a challenge and the matching device key provided by the circuit comprises a response to the challenge.

3. The circuit of claim 1, wherein the external authentication system includes an authentication application that is network connected to an authentication server.

4. The circuit of claim 3, wherein the authentication application is installed on a device that interfaces with the circuit.

5. The circuit of claim 1, wherein the received host key from the external authentication system comprises a currently valid host key.

6. The circuit of claim 5, wherein the currently valid host key changes according to a security policy.

7. The circuit of claim 1, wherein the interface comprises one or more pads on which one or more electrical probes are placed to connect to the circuit.

8. The circuit of claim 1, wherein the interface facilitates communication with the circuit via one wire.

9. The circuit of claim 8, wherein power is provided to the circuit via the one wire.

10. The circuit of claim 1, wherein the interface facilitates serial communication with the external authentication system.

11. The circuit of claim 1, wherein the circuit communicates with the external authentication system with a digital signal or a mixed signal.

12. The circuit of claim 1, wherein no mathematical and/or logical relationships exist between one or more host keys and matching device keys stored in the circuit.

13. The circuit of claim 1, wherein a mathematical and/or logical relationship exists between an original or first host key and matching device key stored in the circuit.

14. The circuit of claim 1, wherein the programmable memory further stores a device identifier that identifies a device or a type of device into which the circuit is embedded.

15. The circuit of claim 1, wherein the programmable memory further stores an encrypted device header.

16. The circuit of claim 1, wherein metal configured memory comprises read-only memory.

17. The circuit of claim 1, wherein programmable memory comprises one time programmable non-volatile memory.

18. The circuit of claim 1, wherein the circuit is included or embedded in an item or product.

19. The circuit of claim 1, wherein the circuit comprises an integrated circuit.

20. A method, comprising:
   configuring metal configured memory of a circuit to store a first portion of each of a plurality of keys and configuring programmable memory of the circuit to store a second portion of each of the plurality of keys, wherein each complete key is separated into metal and programmable portions, the metal portion is fabricated during circuit fabrication, and the programmable portion is programmed in programmable memory of the fabricated circuit; and
   configuring an interface of the circuit to connect to an external authentication system;
   wherein the metal configured memory and programmable memory store a prescribed finite number of host keys and matching device keys; and wherein in response to a received host key from the external authentication system, a matching device key is provided by the circuit.

* * * * *